May 10, 1960     H. E. KALLMANN     2,936,342
SOUND REPRODUCING HEAD

Filed Oct. 31, 1955                                2 Sheets-Sheet 1

INVENTOR:
Heinz E. Kallmann
BY:
Michael S. Struker
agt.

May 10, 1960  H. E. KALLMANN  2,936,342
SOUND REPRODUCING HEAD
Filed Oct. 31, 1955  2 Sheets-Sheet 2

INVENTOR.
Heinz E. Kallmann
BY:
Michael S. Striker
agt.

United States Patent Office 2,936,342
Patented May 10, 1960

2,936,342

SOUND REPRODUCING HEAD

Heinz E. Kallmann, New York, N.Y.

Application October 31, 1955, Serial No. 543,662

7 Claims. (Cl. 179—100.2)

The present invention relates to a device to be used in conjunction with talking books. The object of the present invention serves to reproduce sound tracks from book pages audibly.

Talking books resemble other books in that they comprise flat printed pages bound together. However, talking books incorporate, in addition to printed text and illustrations, short sound tracks each of which may be audibly reproduced with a device according to the present invention. Such talking books may be used as dictionaries where the sound tracks that teach pronounciation are placed near the text that teaches spelling and grammar, or they may offer pictures with adjacent sound tracks to teach beginners to read. Also sound tracks may be used as audible captions for pictures and picture sequences. Such sound tracks may last for one or a few seconds, and they may be in the form of a magnetic recording or grooves of a phonograph recording.

Talking books of the above types are disclosed in U.S. Patent 2,369,572, issued February 13, 1945, as well as in a copending application.

The present invention relates to a small yet complete device which is placed upon the sound track on a page of a talking book in order to reproduce the sound track audibly via a speaker or head phone. The short sound tracks on the page of the talking book may be circular or may be in the form of a few turns of a spiral. Preferably, however, the sound tracks are straight, are a few inches long, and are traversed at a constant speed.

The drawings illustrate devices used with sound tracks which are straight.

Fig. 8 illustrates the manner in which such an automatic self-aligning pick-up assembly operates;

The main features of the present invention are that the device of the present invention and the sound track both remain stationary during operation; that a pick-up is moved at a predetermined speed along the sound track whenever the device is operating; and that the device includes means for aligning the pick-up with the sound track. A push button may actuate an electric motor or wind and release a spring-driven motor. Alignment of the device on the page of the talking book may be by locating pins or the like engaging in locating holes or dimples on the page, or by an automatic aligning mechanism within the reproducing head.

Figure 1:
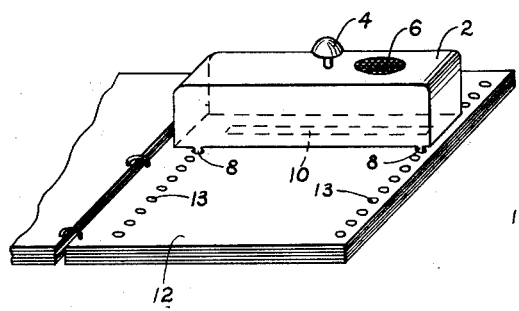
Fig. 1 illustrates a reproducing head placed upon a straight sound track on a page of a talking book.

As may be seen from Fig. 1, the portable device of the present invention includes a casing 2 with a preferably flat base; an actuating button 4; and a speaker 6 or if preferred an attached head phone (not shown). As is shown in Fig. 1, locating pins 8 on the base of the casing engage locating holes 13 on the page 12 of the talking book, and the sound track is located beneath the elongated slot 10 formed in the base of the casing. Typical dimensions may be: casing 1 inch wide, 1½ inches high, and 4 to 8 inches long; the soud tracks may be 4 inches long, 0.090 inch wide, and spaced as close as 0.110 inch center to center.

Figure 2:
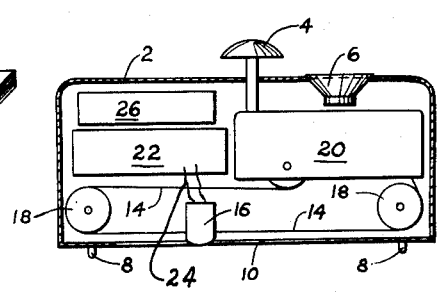
Fig. 2 shows in cross section the interior of the device and diagrammatically illustrates the major components of the device.

Fig. 2 illustrates the major components of the device, with the casing 2, the button 4, the speaker 6, the locating pins 8, and the slot 10, shown in Fig. 1. A pull string 14 is connected to the pick-up 16 to move the latter along the slot 10. This pull string is guided over pulleys 18 by a speed-controlled motor 20, which may be spring driven, for example, and actuated by the push button 4. Actuating the motor by pressing down on a button will minimize the danger of tearing the locating holes in the page of the talking book and will aid in securing contact between the reproducing head and the sound track. Signals from the pick-up 16 are fed via flexible leads 24 (or via two conducting halves of the pull string 14) to an audio amplifier 22 supplied by a battery 26. This amplifier may comprise two or more stages of transistor amplification and may occupy, for example, one cubic inch. It has been found that with a head phone the current consumption of the amplifier of about 3 milliamperes from a 3 volt battery is so low that even under constant use the life of a dry-cell battery occupying less than 1 cubic inch is still nearly as long as its shelf life of approximately two years.

Figure 3:
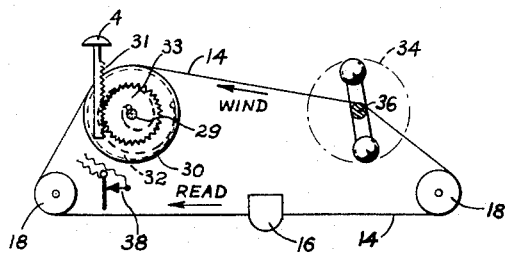
Fig. 3 shows a spring-motor driven mechanism to move a pick-up along a stationary sound track.

Fig. 3 shows the means by which the pick-up 16 is moved along the sound track. The pull string 14 is pulled over pulleys 18 by a drum 30 actuated by a clock spring 32 anchored to a stationary pivot 29 fixed in the interior of the casing. The spring is wound for each reading, and the pick-up 16 is pulled to its starting postion by pushing down the button 4 so that the rack 31 attached to the button 4 turns the pinion 33 fixed coaxially with the drum 30. When the button is released at the end of its travel, the spring tension pulls the pick-up 16 along the sound track for sensing the same and simultaneously raises the button 4, via the rack and pinion, back to its starting position. The pull spring 14 also passes around the spindle 36 of a conventional fly-ball governor 34 which acts by friction to limit the reading speed of pick-up 16 to that with which the track was recorded. A switch 38 actuated by the pick-up 16 automatically energizes the amplifier 22 whenever it is needed for reading.

Figure 4:
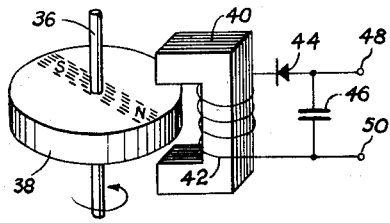
Fig. 4 shows in a partly diagrammatic manner a generator to supply electrical energy to an amplifier while the pick-up is in motion.

Fig. 4 shows an electric generator which may replace battery 26. A permanent magnet 38 transversely magnetized is mounted upon the fast turning spindle 36 of the speed governor. The poles of the permanent magnet 38 move between the ends of a U-shaped iron core 40 to induce an alternating voltage in the winding 42. A rectifier 44 and a filter condenser 46 yield a direct voltage between terminals 48 and 50 that is constant since the speed of rotation is held constant by the speed governor.

In order to reproduce the sound tracks faithfully up to high audio frequencies, alignment between the pick-up and the track is necessary. Parallel displacement relative to the sound track need not be feared. The weight of the device assures contact between the pick-up and track, and a relatively small displacement along the track will merely result in reading the recording a small fraction of a second earlier or later. A lateral misalignment with respect to the sound track also is harmless as long as the magnetic pick-up is wide enough and spacing between the tracks even wider. With respect to angular misalignments, a relatively small forward or backward tilt is harmless. The weight of the pick-up prevents side tilt. However, it is important that the pick-up be positioned so that it is pointed accurately in the direction along which the sound track extends. Various means are shown to assure such alignment.

Figure 5:
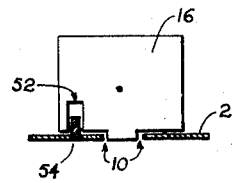
Fig. 5 shows a guide rail for aligning the moving pick-up with the base of the casing of the reproducing head.

Assuming that the casing of the reproducing head is aligned with the sound track by means of locating pins 8 and holes 13, then, as is shown in Fig. 5, the pick-up 16 which travels along slot 10 of the casing 2 is aligned by a notch 52 in the pick-up into which a rail 54 extends, this rail 54 being attached to the casing 2 and being parallel to the elongated slot 10. Thus, the cooperation between the notch 52 and rail 54 guarantees that the pick-up 16 will move along the desired path.

Figure 6:
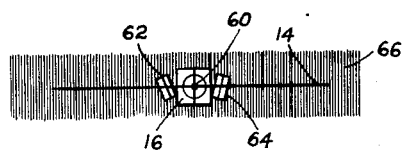
Fig. 6 shows a different type of guide for the pick-up, the structure of Fig. 6 aligning the moving pick-up with an edge or a ridge or a groove which is parallel to the sound track.
Figure 6:
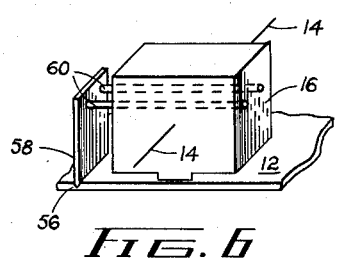

An alternative guide means is shown in Fig. 6 where a member 58 having a straight edge moves along a groove 56 embossed in the page 12 of the talking book and aligned with the sound track to be sensed. Laterally extending rods 60 are fixed to the member 58 and slide in holes in the pick-up 16 so that the latter is forced to move along a path parallel to the groove 56 when pulled by the string 14 in the manner described above.

Figure 7:
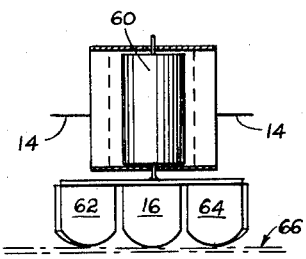
Fig. 7 is an elevation of a self-aligning pick-up assembly.

Fig. 7 shows a device where no precise mechanical locating means are provided in the book and where it may be assumed that the reproducing head is located on the page of the talking book merely by placing a pointer or a mask attached to the casing on the printed outline of a picture or printed text. Fig. 7 shows in side elevation a pick-up assembly which will automatically turn the audio pick-up 16 so that it is directed in the same direction that the sound track 66 extends. To this end, the pull string 14 is attached to the casing of an electric meter system 60 such as a system of the d'Arsonval type. The moving part of the pick-up carries, instead of a pointer, a group of three pick-ups, namely, the audio pick-up 16 and in addition two pick-ups 62 and 64 suitable for a high audio frequency $f_g$ above the range reproduced by the speaker 6.

Fig. 8 shows the three pick-ups in a top view above the sound track 66. This sound track now carries, in addition to the audio recording, a recording of the frequency $f_g$ with constant amplitude. The auxiliary pick-ups 62 and 64 are mounted in front of and behind the audio pick-up, respectively, one of the auxiliary pick-ups being turned to the left, and the other of the auxiliary pick-ups being turned by the same angle to the right with respect to the central audio pick-up 16. With proper alignment the auxiliary pick-ups respond to the recording of $f_g$ with equal outputs. Otherwise, the pick-up which is aligned more accurately with the sound track yields the larger output. The difference between these outputs, amplified if necessary by means which are not shown, and rectified, is applied to the meter system 60 with polarity to turn it towards the proper aligned position until the alignment error, and the difference between the voltages, are zero.

Figure 9:
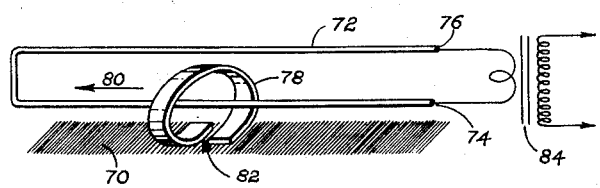
Fig. 9 shows one form of pick-up which does not require any flexible leads to be connected to the amplifier.
Figure 10:
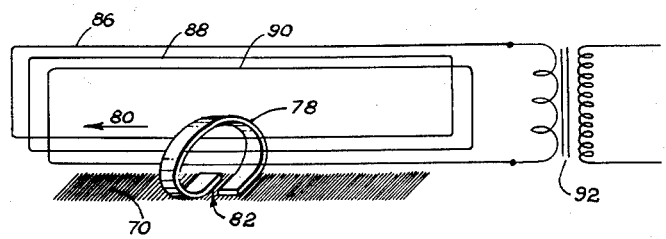
Fig. 10 shows a variation of the embodment of Fig. 9.

Although it is possible to use flexible leads 24, as shown in Fig. 2, sometimes such an arrangement is inconvenient in order to connect the moving pick-up 16 to the stationary audio amplifier 22. With the modifications shown in Figs. 9 and 10, such flexible connecting leads are unnecessary. In Fig. 9 the markings 70 represent the stationary magnetic sound track to be sensed. Parallel to and above the sound track there is mounted within the casing a rigid, stationary U-loop 72 made, for example, of copper rod, and having legs each of which is at least as long as the sound track to be read. The two ends 74 and 76 of the U-loop are the signal output terminals, connected via the step-up transformer 84 to the input of the amplifier 22. The only part which now needs to be moved for reading the sound track is the ring 78 surrounding one leg of the stationary U-loop. Essentially the ring 78 consists of slightly more than one turn of a closewound helix of ferromagnetic material. It is moved along the U-loop in the direction of arrow 80 by any suitable means such as the pull string 14 described above. The adjacent edges at the ends of the ring, shown at 82, form the magnetic gap and are kept in contact with the sound track while the device is in operation. The magnetic flux produced by reading in the ring 78 in turn induces a signal voltage in the U-loop linked with it. Since this signal voltage is low, the turns ratio of the step-up transformer 84 may be as large as 1:2000. While an arrangement as shown in Fig. 9 is quite feasible, in some cases it may be preferred to modify the arrangement as indicated in Fig. 10, where the one-turn U-loop is replaced by a multi-turn oblong loop of $n$ turns, such as 86, 88, and 90, and the turns ratio of the step-up transformer 92 may then be reduced $n$-fold.

Although they are not shown, other forms of short sound tracks may be used. Thus, circular sound tracks or sound tracks composed of a few turns of a spiral may be used, and corresponding motions of a movable pick-up within a stationary reproducing device are provided. Also, two sound tracks which are side-by-side may be read in immediate sequence, the one during the forward travel of the pick-up assembly, and the other during the immediate return thereof, either by using the same pick-up laterally displaced, or by using two audio pick-ups side by side and switching on one at a time as required. Besides doubling the reading time, such arrangements will bring the pick-up assembly back to the starting point ready for instant new use.

I claim:

1. An arrangement for reproducing a sound from a magnetic sound track on a page of a talking book comprising, in combination, a support adapted to engage the page of a talking book and to remain stationary thereto while sound is being reproduced; a magnetic pick-up means having a pick-up portion; means mounting said pick-up means on said support for moving on the same along a predetermined path with said pick-up portion thereof facing a sound track on the page of the talking book when said support is placed thereon in properly aligned position; alignment means on said support; corresponding alignment means on said book arranged so that when said two alignment means on said support and said book cooperate, said predetermined path of movement of said pick-up means is located properly aligned with respect to a sound track on the page of the talking book; manually operable actuating means for moving said pick-up means on said mounting means along said predetermined path properly aligned with and facing with its pick-up portion the sound track to be scanned, said actuating means including a motor, an actuating button, and a speed governor; and means operatively connected to said pick-up means for reproducing sound during the scanning of the sound track by the pick-up means.

2. An arrangement for reproducing a sound from a magnetic sound track on a page of a talking book comprising, in combination, a support adapted to engage the page of a talking book and to remain stationary thereto while sound is being reproduced; a magnetic pick-up means having a pick-up portion; means mounting said pick-up means on said support for moving on the same along a predetermined path with said pick-up portion thereof facing a sound track on the page of the talking book when said support is placed thereon in properly aligned position; alignment means on said support; corresponding alignment means on said book arranged so that when said two alignment means on said support and said book cooperate, said predetermined path of movement of said pick-up means is located properly aligned with respect to a sound track on the page of the talking book; manually operable actuating means for moving said pick-up means on said mounting means along said predetermined path properly aligned with and facing with its pick-up portion the sound track to be scanned, said actuating means including a spring motor, a manually operable device for winding said spring motor, and a speed governor; and means carried by said support and operatively connected to said pick-up means for reproducing sound during the scanning of the sound track by the pick-up means.

3. An arrangement for reproducing a sound from a magnetic sound track on a page of a talking book comprising, in combination, a support adapted to engage with a bottom face thereof the page of a talking book and to remain stationary thereto while sound is being reproduced; a magnetic pick-up means having a pick-up portion; means mounting said pick-up means on said support for moving on the same along a predetermined path with said pick-up portion thereof facing a sound track on the page of the talking book when said support is placed thereon in properly aligned position; alignment means on said support and comprising at least two pins mounted spaced from each other on and projecting substantially normal to said bottom face from said support; corresponding alignment means on said book in the form of apertures in the page of the book and arranged so that when said two alignment means on said support and said book cooperate, said predetermined path of movement of said pick-up means is located properly aligned with respect to a sound track on the page of the talking book; manually operable actuating means for moving said pick-up means on said mounting means along said predetermined path properly aligned with and facing with its pick-up portion the sound track to be scanned, said actuating means including a spring motor, a manually operable rack and pinion device for winding said spring motor, and a speed governor, said rack extending in a direction substantially normal to said bottom face so that in operating said rack said bottom face is pressed against the page of the book; and means carried by said support and operatively connected to said pick-up means for reproducing sound during the scanning of the sound track by the pick-up means.

4. An arrangement for reproducing a sound from one of a plurality of magnetic sound tracks on a page of a talking book comprising, in combination, an elongated, narrow casing adapted to engage with a bottom thereof the page of a talking book and to remain stationary thereto while a sound is being reproduced; a magnetic pick-up means having a pick-up portion; means mounting said pick-up means on said casing for moving on the same along a predetermined path with said pick-up portion thereof facing one of the sound tracks on the page of the talking book when said casing is placed thereon in properly aligned position; alignment means on said casing and comprising at least two pins mounted spaced from each other on and projecting substantially normal to said bottom face from said casing; corresponding alignment means on said book in the form of apertures, arranged adjacent to each of the sound tracks with a spacing corresponding to the spacing of said pins so that when said pins on said casing are engaged in the apertures adjacent to one of the sound tracks, said predetermined path of movement of said pick-up means is located properly aligned with respect to said one sound track on the page of the talking book; manually operable actuating means mounted on said casing for moving said pick-up means on said mounting means along said predetermined path properly aligned with and facing with its pick-up portion the sound track to be scanned, said actuating means including a motor, an actuating button and a speed governor; and means carried within said casing and operatively connected to said pick-up means for reproducing sound during the scanning of the sound track by the pick-up means.

5. In a device for producing a sound from a magnetic sound track on a page of a talking book, in combination, a casing; an audio amplifier located within said casing; an electrically conductive loop located within said casing; a set-up transformer interconnecting said loop with said audio amplifier; and a magnetic pick-up ring through which said loop passes movable with respect to said loop for sensing a sound track.

6. In a device for producing a sound from a magnetic sound track on a page of a talking book, in combination, a casing; a magnetic pick-up movable with respect to said casing for sensing a magnetic sound track; moving means operatively connected to said pick-up and carried by said casing for moving said pick-up with respect to said casing; manually operable means for actuating said moving means; an audio amplifier located in said casing and connected electrically to said pick-up; a governor operatively connected to said moving means for controlling the speed with which the latter moves said pick-up; and a generator driven by said governor and connected electrically to said audio amplifier for energising the same.

7. An arrangement for reproducing a sound from a magnetic sound track on a page of a talking book comprising, in combination, a support adapted to engage the page of a talking book and to remain stationary thereto while sound is being reproduced; a magnetic pick-up means having a pick-up portion; means mounting said pick-up means on said support for moving on the same along a predetermined path with said pick-up portion thereof facing a sound track on the page of the talking book when said support is placed thereon in properly aligned position and for orienting said pick-up means with respect to said sound track, said sound track having in addition to an audio recording a recording of a frequency with constant amplitude, and said means for mounting and orienting said pick-up means including two auxiliary pick-ups respectively located at opposite sides of said pick-up means and fixed thereto at angular positions respectively oppositely inclined to the axis of the sound track, said auxiliary pick-ups adapted to cooperate with said recording of a frequency with constant amplitude to orient said pick-up means with regard to said sound track; manually operable actuating means for moving said pick-up means on said mounting means along said predetermined path properly aligned with and facing with its pick-up portion the sound track to be scanned; and means carried by said support and operatively connected to said pick-up means for reproducing sound during the scanning of the sound track by the pick-up means.

References Cited in the file of this patent
UNITED STATES PATENTS

| | | |
|---|---|---|
| 873,084 | Poulsen | Dec. 10, 1907 |
| 2,124,673 | Puma | July 26, 1938 |
| 2,548,011 | Frost | Apr. 10, 1951 |
| 2,603,006 | MacChesney et al. | July 15, 1952 |